US007457493B1

(12) United States Patent
Li et al.

(10) Patent No.: US 7,457,493 B1
(45) Date of Patent: Nov. 25, 2008

(54) MULTI-BEAM MULTI-APERTURE OPTICAL BEAM STEERING MODULE

(75) Inventors: Le Li, Hopewell Junction, NY (US); Haiping Yu, Hopewell Junction, NY (US); Ben Tang, Wappingers Falls, NY (US); Jianhui Li, Wappingers Falls, NY (US); Hejun Ma, Wappingers Falls, NY (US); Fang Du, Ossining, NY (US)

(73) Assignee: Kent Optronics, Fishkill, NY (US)

( * ) Notice: Subject to any disclaimer, the term of this patent is extended or adjusted under 35 U.S.C. 154(b) by 155 days.

(21) Appl. No.: 11/433,149

(22) Filed: May 12, 2006

Related U.S. Application Data

(60) Provisional application No. 60/683,479, filed on May 14, 2005.

(51) Int. Cl.
*G02B 6/26* (2006.01)

(52) U.S. Cl. .............................. 385/16; 385/18; 385/22
(58) Field of Classification Search ............. 385/16–23; 353/20
See application file for complete search history.

(56) References Cited

U.S. PATENT DOCUMENTS

| 6,839,472 | B1* | 1/2005 | Faris et al. ................. 385/8 |
| 2004/0062473 | A1* | 4/2004 | Li et al. ..................... 385/21 |

\* cited by examiner

*Primary Examiner*—Charlie Peng
(74) *Attorney, Agent, or Firm*—Rodney T. Hodgson

(57) ABSTRACT

An m×n fan out device for receiving at least m=2 laser beams of different wavelengths and dividing the power of each laser beam into at least two other laser beams directed to at least one of n exit ports of the fan out device is disclosed.

9 Claims, 8 Drawing Sheets

800

900

MULTI-BEAM MULTI-APERTURE OPTICAL BEAM STEERING MODULE

CROSS REFERENCE TO RELATED APPLICATIONS

This application claims priority pursuant to 35 U.S.C. 119 (e) to U.S. Provisional Application 60/683,479 filed 14 May, 2005.

FIELD OF THE INVENTION

This invention relates to a multi-spectrum multi-aperture multi-beam optical beam steering module.

BACKGROUND OF THE INVENTION

In current optical network, laser target tracking, and free space optical communication have been developed as separate optical systems. Because of the size, weight and power constraints, it makes sense to combine functionality of these systems. The development of such common pointing and tracking systems, common laser optics, transmit and receive subsystems, and adaptive optics will dramatically reduce the size, weight and power and maintain individual technical functionality.

Although conceptual designs of the multi-beam, multi-aperture system have many potential configurations, the challenge is to design a system for combining these distinct, but related functions. This invention relates to developing the multi-beam payload that can show individual beam steering, multiple beam transmission through multiple apertures.

Current beam steering products and/or technologies steer single laser beam. A gimbal beam steering device (BSD) represents the most matured technology[1]. However, it is slow, inaccurate, bulky, heavy, power hungry, and inherently lack of capability of steering multi-beams. Optical-Acoustic[2,3,4] BSD is another developed technology. But it is power hungry and has limited beam aperture size and beam programmability. State-of-the-art BSD technologies includes liquid crystal optical phased array (LCOPA)[1,2], ferroelectric liquid crystal (FLC) spatial light modulation (SLM)[3], liquid crystal blazed grating[4], liquid crystal retarder or birefringent BSD[5], multi-plexed liquid crystal BSD[6], and Microelectomechanical system (MEMs)[7,8,9]. MEMs technology relies on mechanical tilt or swing of micro-mirrors and is intrinsically a mechanical steering device. Liquid crystal based BSDs are stationary and are more sophisticated. Ferroelectric liquid crystals (FLC) is fast, on the order of microseconds. However, in order to have a continuous phase shift capability, a multiple layer structure of n binary devices each having a thickness $2\pi/n$ must be adopted.

APPLICATIONS ASSIGNED TO THE ASSIGNEE OF THE PRESENT INVENTION

The following U.S. Patents and U.S. Patent applications are assigned to the assignee of the present invention: U.S. Pat. No. 6,674,504 issued Jan. 6, 2004; U.S. Pat. No. 6,885,414 issued Apr. 26, 2005; U.S. Pat. No. 6,999,649 issued Feb. 14, 2006; U.S. patent application Ser. No. 10/816,345 filed Apr. 1, 2004; U.S. patent application Ser. No. 10/816,343 filed Apr. 1, 2004; U.S. patent application Ser. No. 10/977,180 filed Oct. 30, 2004 U.S. patent application Ser. No. 10/977,665 filed Oct. 29, 2004; and U.S. Provisional Patent Application No. 60/683,479 filed May 14, 2005.

DESCRIPTION OF THE INVENTION

This invention discloses a non-mechanical, multi-aperture, multi-beam payload system with multiple independently-steered beams necessary to increase an optical platform cross-functional hardware link availability of a node to form a robust network. The agile multi-beam multi-aperture optical payload has multiple apertures. It independently steers "N×M" laser beams at different wavelengths at a fast speed. Here M is the number of the apertures (or terminals) and N is the number of laser beams independently steered out of each terminal/aperture. N can also be the number of laser wavelength when equipped with multiple lasers. The multi-beam steering at different laser wavelengths is enabled by a set of optical fan-out scanner switches and the switchable dichroic mirrors while the fast speed is achieved by utilizing the fast liquid crystal materials to be described.

Figure 1:
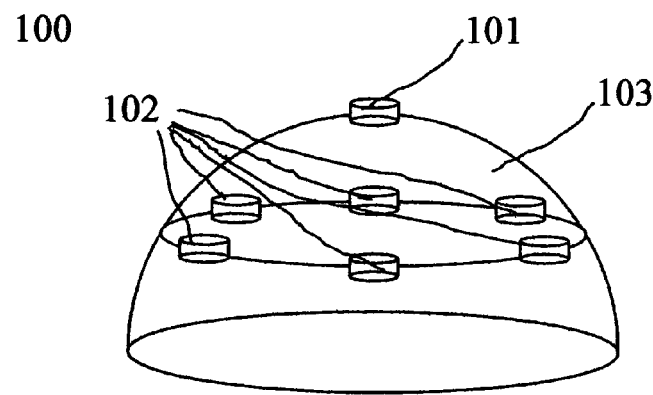
FIG. 1 shows a schematic of the beam steering module.

FIG. 1 shows an exemplary design of a multi-beam payload (100), where seven apertures (101, 102) equipped with multiple individual beam steering devices (BSD) are mounted on a semi-sphere shell (103). For example, the apertures are such arranged that aperture (101) is located at the shell top while the rest six apertures (102) are evenly distributed and aligned along the "meridian line" in the middle of the shell.

Each individual beam steering aperture has N individual beam steering devices (BSD). Each BSD has an elevation field of view (FOV) of ±41° and a horizontal FOV of ±360° in its own coordinate frame. Our design simulation shows that such a payload with seven apertures in the arrangement as shown in FIG. 1 is able to fully cover the 2π hemisphere solid angle. If two identical payloads as shown in FIG. 1 are assembled together such that one upward and one downward, the final multi-beam payload is able to fully cover the entire 4π solid angle.

Each beam steering device adopts a coarse-fine architecture, which can be similar to that described by Khan et al[1], as an example. Or, each BSD can be a cascade of several liquid crystal based optical phased array devices. In the coarse-fine BSD similar to Khan's design, the coarse steerer provides with a discrete angular scanning while the fine steerer fills up the angular gaps between two neighboring angles of the coarse stages. In the payload system with seven apertures, the coarse steerer consists of five stages of fast speed liquid crystal wave plate and birefringent prism while the fine steerer has seven staked programmable liquid crystal prism in order to cover the required ±41° FOV in elevation.

Figure 2:
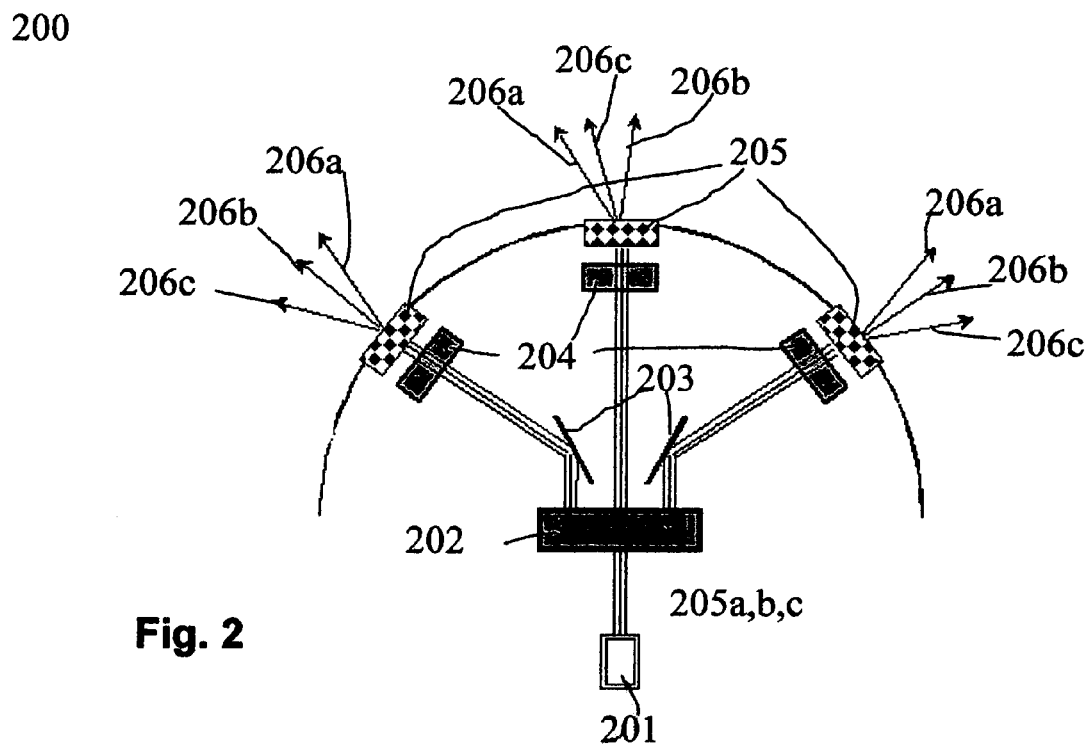
FIG. 2 shows a 1-dimensional (1-D) schematic illustration of the detailed optical sketch of the multi-beam payload.

FIG. 2 shows the cross section of the multi-payload (200). In this system, there is a laser bank (210) containing three lasers at wavelength $\lambda_1$(206a), $\lambda_2$(206b) and $\lambda_3$(206c). After the laser bank, there are three sets of 1×7 fan-out scanner switches (202) that fan-out or scan one or two or all of the three laser beams through any one or all of the seven exiting ports on the 1×7 fan-out scanner switches (202). The exiting laser beam(s) then hit the optional mirror (203) and are directed to any one, or two, or all three 3×(1×3) fan-out scanner switches (204). After each 3×(1×3) fan-out scanner switch there is an optical beam steering device (205) which steers out any one, or two, or all the three laser beams (206a, b, c).

Figure 3:
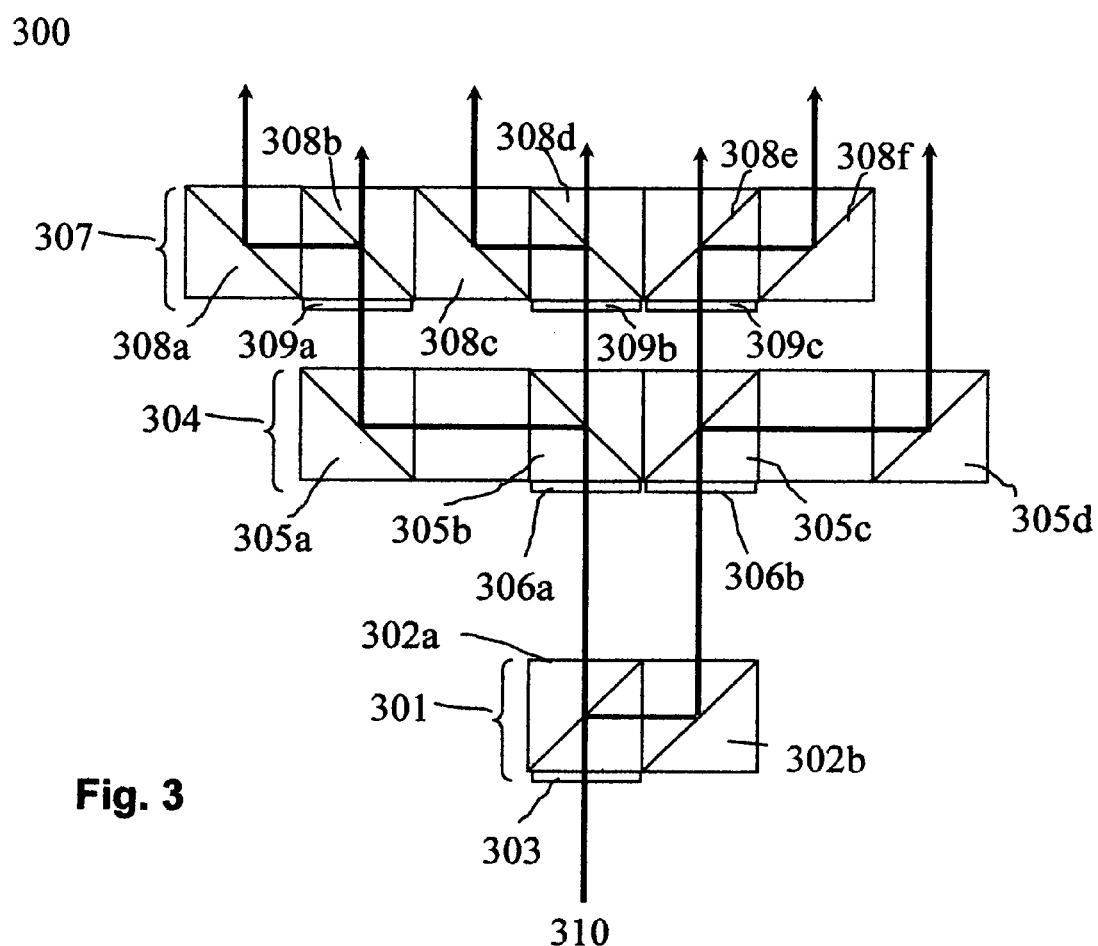
FIG. 3 shows a single wavelength 1×7 fan-out scanner switch.

FIG. 3 shows a single 1×7 fan-out scanner switch (300). It consists of three optics arrays consisting of polarizing beam splitters (PBS) and programmable wave plates. The first array (301) has at least two polarizing beam splitters (302a, 302b) and at least one programmable wave plate (303a). The second array (304) has at least four polarizing beam splitters (305a, 305b, 305c, 305d) and at least two programmable wave plates (306a, 306b). The third array (307) has at least six polarizing beam splitters (308a, 308b, 308c, 308d, 308e, 308f) and at least three programmable wave plates (309a, 309b, 309c).

Each polarizing beam splitter passes P-polarization and reflects S-polarization. In P-polarization, the vector of the electric field vibration of the light beam is within the incident plane while in S-polarization the vector is perpendicular to the incident plane.

Each programmable wave plate can be made from an electro-optically active medium such as a nematic liquid crystal in homogeneous alignment texture although other materials such ferro-electric liquid crystal and/or other crystal materials. The optical phase of each programmable wave plate can be electrically controlled to be 0, $\lambda/4$, and $\lambda/2$, where $\lambda$ is the wavelength of the laser beam (310) being steered. The incident laser is linearly polarized in either P- or S-polarization. The optical axis of each wave plate is 45° oriented with respect to the incident laser polarization direction.

Assume the incident laser beam (310) is P-polarized. When all the programmable wave plates have a phase retardation of $\lambda/4$, the incident laser beam (310) is converted from linear polarization into circular polarization after passing the programmable wave plate (303). This circularly polarized laser beam is then split into two polarization components after passing through the polarizing beam splitter (302a). The transmitted P-polarization beam from the polarizing beam splitter (302a) is converted again into circular polarization after passing through the programmable wave plate (306a) and is split again into one P-polarization beam and one S-polarization beam after passing through the polarizing beam splitter (305b). The reflected S-polarization beam from the polarizing beam splitter (302a) is reflected again by the next polarizing beam splitter (302b). This reflected S-polarization beam is then converted into circular polarization after passing through the programmable wave plate (306b) and then is split into one P-polarization and one S-polarization by the polarizing beam splitter (305c). This analysis process is repeated to the very end where seven laser beams are simultaneously output from the seven exiting polarizing beam splitters (308a, b, c, d, e, f) and (306d). The output laser beams from the polarizing beam splitters (308a, c, f) and (306d) are S-polarized while the output laser beams from the polarizing beam splitters (308b, d, e) are P-polarized.

When the wave plates are sequentially switched between 0 and $\lambda/2$, this device (300) is a scanner that scans the incident laser beam (310) from one of the seven exiting polarizing beam splitters (308a, b, c, d, e, f) and (306d) to another. For example, if all the wave plates have zero (0) retardance, the incident laser beam (310) is not affected by any polarizing beam splitter as well as programmable wave plate and exits from the exiting polarizing beam splitter (308d). Next, assume the programmable wave plate (303) is switched to have $\lambda/2$ retardance which rotates a linear polarization by 90 degree if the polarization is 45° with respect to the programmable wave plate optical axis. However, the rest programmable wave plates are in zero (0) retardance. In this situation, the P-polarization of the incident laser beam (310) is rotated 90° by the programmable wave plate (303) to become S-polarization and is reflected by the polarizing beam splitter (302a). This S-polarization beam is then reflected again by the polarizing beam splitters (305c, 305d) to become an exiting beam. Therefore, the incident laser beam (310) is scanned from the exiting polarizing beam splitter (308d) to the exiting polarizing beam splitter (305d) if the optical retardance of the programmable wave plate (303) is switched from zero (0) to $\lambda/2$.

This analysis process is valid if any number of the programmable wave plates are switched between zero (0) and $\lambda/2$ retardance therefore the incident laser beam can be scanned from any one of the exiting polarizing beam splitters.

When some of the wave plates have either zero (0) or $\lambda/2$ retardance while others have $\lambda/4$ retardance, this device can output arbitrary number of laser beams (no more than 7 beams) from arbitrary exiting polarizing beam splitters of this 1×7 fan-out scanner switch.

When three of these single wavelength 1×7 fan-out scanner switches operating at three separate wavelengths of $\lambda_1$, $\lambda_2$, and $\lambda_3$ are stacked together in parallel, a multi-spectral 1×7 fan-out scanner switch is formed.

The above design can be generalized to become "1×N" fan-out scanner switch where one laser beam can be fanned-out into "N" laser beams from "N" exiting polarizing beam splitters and/or one laser beam can be scanned out of one of the "N" exiting polarizing beam splitters.

Figure 4:
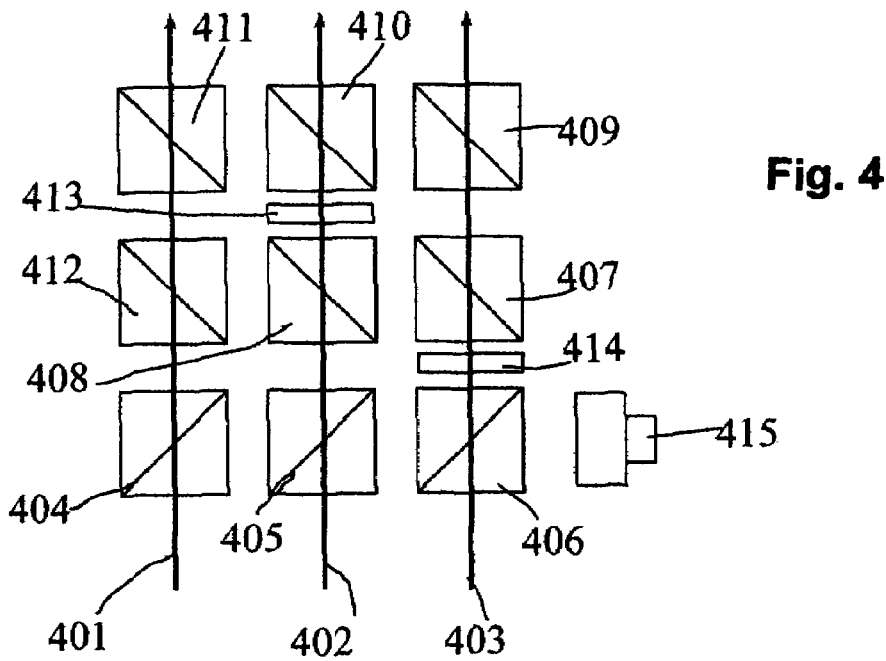
FIG. 4 shows the general structure of the multi-spectral 3×(1×3) fan-out scanner switch.

FIG. 4 shows a multi-spectral 3×(1×3) fan-out scanner switch (400) with three input ports to accept three laser beams (401, 402, 403) at three laser wavelengths $\lambda_1$, $\lambda_2$, $\lambda_3$. Each input port accepts one laser beam. The 3×(1×3) fan-out scanner switch has the wavelength hopping capability through a set of switchable dichroic mirrors (404, 405, 406).

The switch (400) consists of three switchable dichroic mirrors (404, 405, 406), at least two programmable wave plates (413, 414) made, for example, from liquid crystal (LC), for example, and at least five braodband polarizing beam splitters (407-411). The braodband polarizing beam splitter (412) is optional. The beam stopper collects un-fanned-out or un-scanned laser beam(s).

Switchable mirror (504) can be switched between transparent and reflection states to laser beam (501) at wavelength $\lambda_1$. Switchable mirror (505) can be switched between transparent and reflection states to either one of or both laser beams (502, 502) at $\lambda_1$ and $\lambda_2$. For example, it can be switched between transparent and reflection state to laser beams (502) at $\lambda_2$ while to pass laser beam (501) at $\lambda_1$ all the time. Switchable mirror (506) can be switched between transparent and reflection states to either one of or two of or all three laser beams (501, 502, 503) at $\lambda_1$, $\lambda_2$ and $\lambda_3$. For example, it can be switched between transparent and reflection state to laser beam (503) at $\lambda_3$ while to pass laser beams (501, 502) at $\lambda_1$ and $\lambda_2$.

As a first example as shown in FIG. 4, when all the two programmable wave plates (413, 414) are set to have zero (0) retardance and all the three switchable mirrors (404, 405, 406) are switched in clear state. Assume the three laser beams (401, 402, 403) at the three separate wavelengths of $\lambda_1$, $\lambda_2$, and $\lambda_3$ are in P-polarization. Further assume all the braodband polarizing beam splitters pass P-polarization while reflect S-polarization. In this situation, the laser beam (401) passes the switchable mirror (404), the braodband polarizing beam splitters (412, 411) to become an exiting beam from the braodband polarizing beam splitter (411). The laser beam (402) passes the switchable mirror (405), the braodband polarizing beam splitters (408, 410), and programmable wave plate (413) to become an exiting beam from the braodband polarizing beam splitter (410). The laser beam (403) passes the switchable mirror (406), the braodband polarizing beam splitters (407, 409), and programmable wave plate (414) to become an exiting beam from the braodband polarizing beam splitter (409). Therefore, the three laser beams simultaneously exit from the corresponding braodband polarizing beam splitters of the switch. Each exiting laser beam is then independently steered by the corresponding beam steering device (not shown in the figure) placed after the corresponding braodband polarizing beam splitter.

Figure 5:
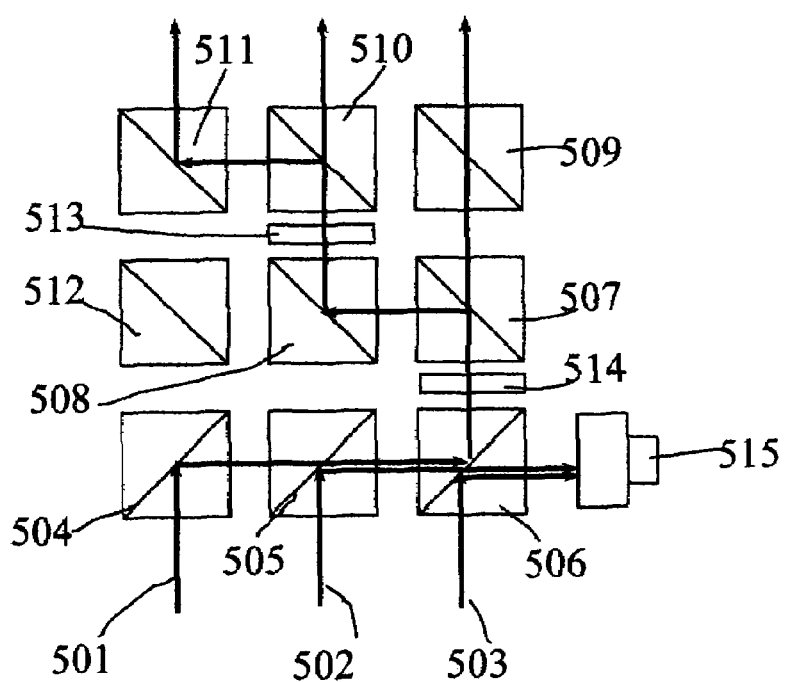
FIG. 5 shows 3×(1×3) a Fan-out scanner switch where the three laser beams at $\lambda_1$, $\lambda_2$, and $\lambda_3$, are simultaneous output for steering.

FIG. 5 shows second exemplary operation of the multi-spectral 3×(1×3) fan-out scanner switch (500) that fans-out three laser beams at the same wavelength of $\lambda_1$. In this situation, switchable mirror (504) is switched to reflect laser beam (501) at wavelength $\lambda_1$. Switchable mirror (505) is switched to reflect laser beam (502) at $\lambda_2$ while to pass laser beam (501) at $\lambda_1$. Switchable mirror (506) is switched to reflect laser beams (501, 503) at $\lambda_1$ and $\lambda_3$ while to pass laser beam (502) at $\lambda_2$.

The two wave plates are set to have $\lambda/4$ retardance, which transform the linearly polarized incident laser beam into circularly polarized beam.

The P-polarized laser beam (501) at $\lambda_1$, after being reflected by the switchable mirror (504), transmitted by the switchable mirror (505), and reflected again by the switchable mirror (506), is directed to the liquid crystal wave plate (514) with $\lambda/4$ retardance where the beam is transformed into circular polarization state. This circularly polarized beam is split into two linearly polarized beams after passing through the braodband polarizing beam splitter (507). The transmitted P-polarization beam passes through the braodband polarizing beam splitter (509) to become the first exiting beam at $\lambda_1$. The reflected S-polarization beam passes another programmable wave plate (513) with $\lambda/4$ and is transformed into circular again. This circular beam is then split into two linearly polarized beams again after passing the braodband polarizing beam splitter (510). The transmitted P-polarization beam passes through the braodband polarizing beam splitter (510) to become the second exiting beam at $\lambda_1$. The reflected S-polarization beam is reflected again by the braodband polarizing beam splitter (511) to become the third exiting beam at $\lambda_1$. Therefore, this device fans-out the incident laser beam (501) into three laser beams at the same wavelength of $\lambda_1$. The laser beam (502) at $\lambda_2$ is reflected by the switchable dichroic mirror (505), passes through the switchable mirror (506) and is collected by the beam stopper (515). The laser beams (503) at $\lambda_3$ is reflected by the switchable dichroic mirror (506) and is collected by the beam stopper (515).

The same discussion holds for fanning out laser beams at other wavelength of $\lambda_2$ and $\lambda_3$, respectively.

Figure 6:
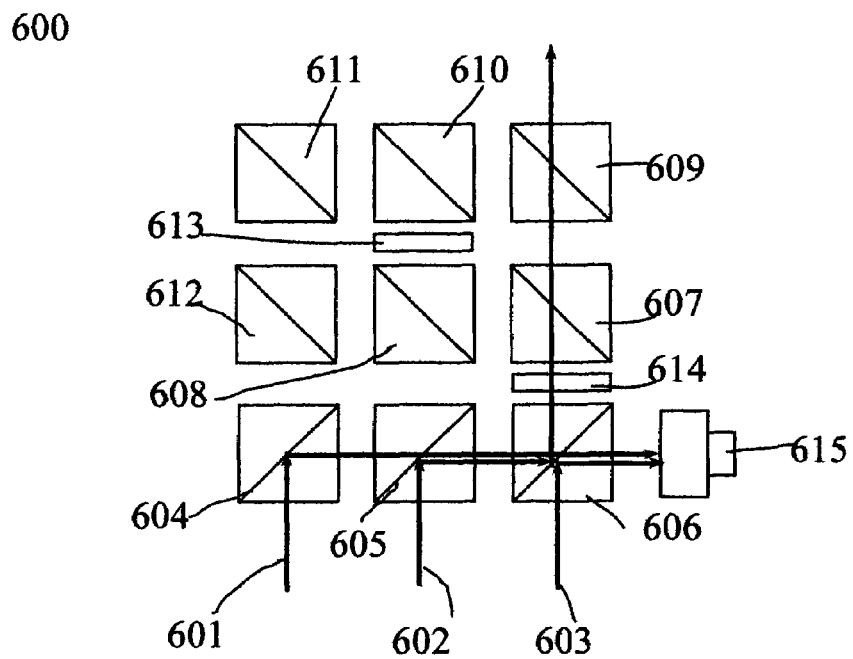
FIG. 6 shows a 3×(1×3) Fan-out scanner switch.

FIG. 6 shows the second exemplary operation of the multi-spectral 3×(1×3) fan-out scanner switch (600) that fans-out only one laser beam at wavelength of $\lambda_2$. In this situation, switchable mirror (604) is switched to reflect laser beam (601) at wavelength $\lambda_1$. Switchable mirror (605) is switched to reflect laser beam (602) at $\lambda_2$ while to pass laser beam (601) at $\lambda_1$. Switchable mirror (606) is switched to reflect laser beams (602, 603) at $\lambda_2$ and $\lambda_3$ while to pass laser beam (601) at $\lambda_1$.

The programmable wave plate (614) is set to have zero (0) retardance.

The P-polarized laser beam (601) at $\lambda_1$, after being reflected by the switchable mirror (604), transmitted by the switchable mirrors (605, 606), and is collected by the beam stopper (615).

The P-polarized laser beam (602) at $\lambda_2$, after being reflected by the switchable mirror (605) is reflected by the switchable mirror (606). The reflected P-polarization beam is directed to the liquid crystal wave plate (614) with zero (0) retardance where the beam polarization is unchanged. This P-polarization beam then passes through the two polarizing beam splitter (607, 609) to become an exiting beam from the polarizing beam splitter (609). Therefore, this device outputs only one laser beam at wavelength $\lambda_1$ from the polarizing beam splitter (609). The laser beam (603) at $\lambda_3$ is reflected by the switchable dichroic mirror (606) and is collected by the beam stopper (615).

Same discussion holds for fanning out one laser beam at other wavelength of $\lambda_1$ and $\lambda_3$, respectively.

The above design can be generalized to become "N×(1×N)" fan-out scanner switch where "N" laser beams can be fanned-out into "M" ($1 \leq M \leq N$) laser beams either at the same or different wavelengths.

Figure 7A:
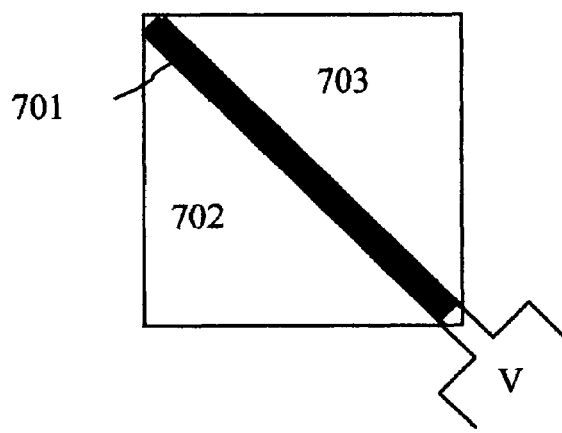
FIG. 7A shows a switchable dichroic mirror.
Figure 7B:
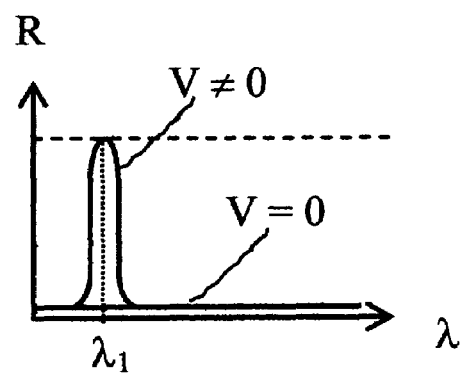
FIG. 7B shows a graph of reflectivity vs wavelength of a switchable dichroic mirror.

FIG. 7(a) shows the switchable dichroic mirror (700) which is used as the switchable dichroic mirror (404) in FIG. 4, (504) in FIG. 5, and (604) in FIG. 6. Its electro-optical response is schematically illustrated in FIG. 7(b), where the switchable dichroic mirror is in transparent state under zero electric field and exhibits a narrow band reflection peak at the desired laser wavelength $\lambda_1$ under non-zero sufficient electric field.

This switchable dichroic mirror (700) is made, for example, from a switchable holographic liquid crystal (H-LC) film (701) between two right-angle prisms (702, 703). The switchable holographic liquid crystal is in optically clear state (transparent state), for example, under zero electric field. The holographic film can be switched into a reflection state by applying an electric field across the film. In the reflection state, the holographic film exhibits a barrow band reflection peak at the pre-determined wavelength $\lambda_1$. The switchable holographic film is made from a liquid crystal composite under holographic exposure condition The switchable holographic film can also be made in a reverse mode, where it is in optically clear state (transparent state) under non-zero electric field and exhibits a narrow band reflection peak at the pre-determined wavelength $\lambda_1$ under zero electric field.

Figure 8A:
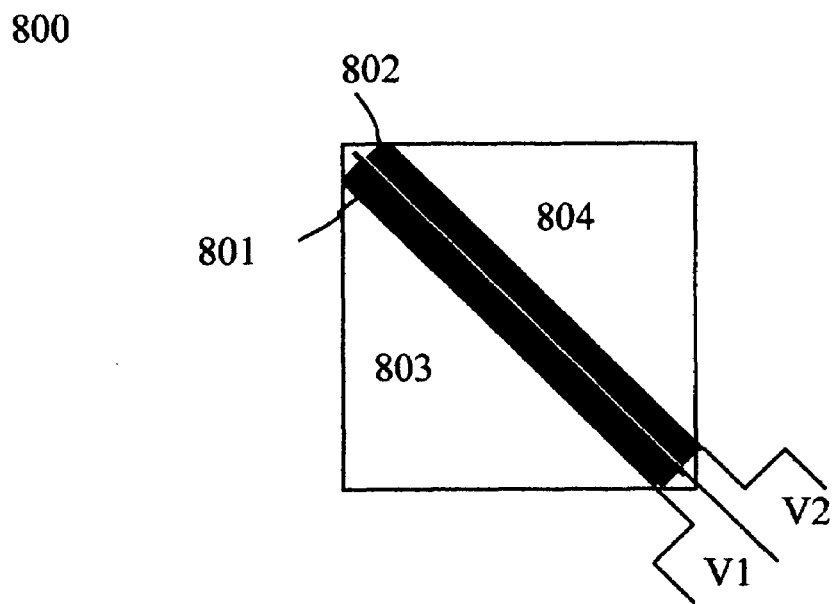
FIG. 8A shows s switchable dichroic mirror.

FIG. 8(a) shows the switchable dichroic mirror (800) which is used as the switchable dichroic mirror (405) in FIG. 4, (505) in FIG. 5, and (605) in FIG. 6. This switchable dichroic mirror (800) contains two stacked switchable holographic liquid crystal (H-LC) films (801, 802). The switchable holographic liquid crystal film (801) reflects a narrow band at the laser wavelength $\lambda_1$ under non-zero electric field and is in transparent state under zero electric field. The switchable holographic liquid crystal film (802) reflects at the laser wavelength $\lambda_2$ under non-zero electric field and is in transparent state under zero electric field. The two switchable holographic films (801, 802) are sandwiched between two right-angle prisms (803, 804).

Figure 8B:
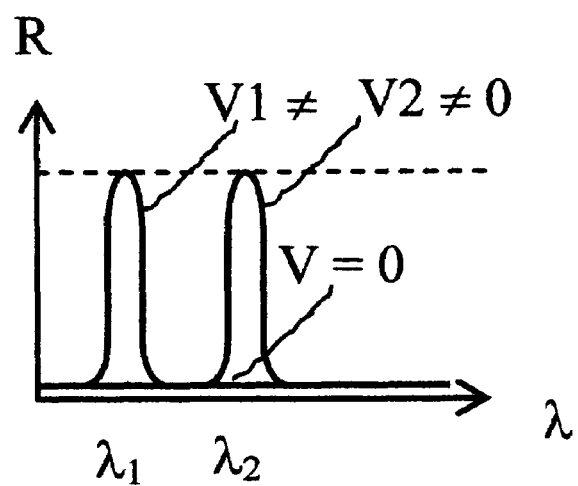
FIG. 8B shows a schematically shows the electro-optical response of a switchable dichroic mirror.

FIG. 8(*b*) schematically shows the electro-optical response of this switchable dichroic mirror. The mirror is in transparent state when both switchable holographic films (801, 802) are under zero electric field. The mirror exhibits two narrow band reflection peaks at the desired laser wavelengths $\lambda_1$ and $\lambda_2$ when both holographic films (801, 802) are under non-zero electric field. The mirror can also exhibit one narrow band reflection peak at either $\lambda_1$ or $\lambda_2$ when either one of the two holographic films (801, 802) is under non-zero electric field.

Figure 9A:
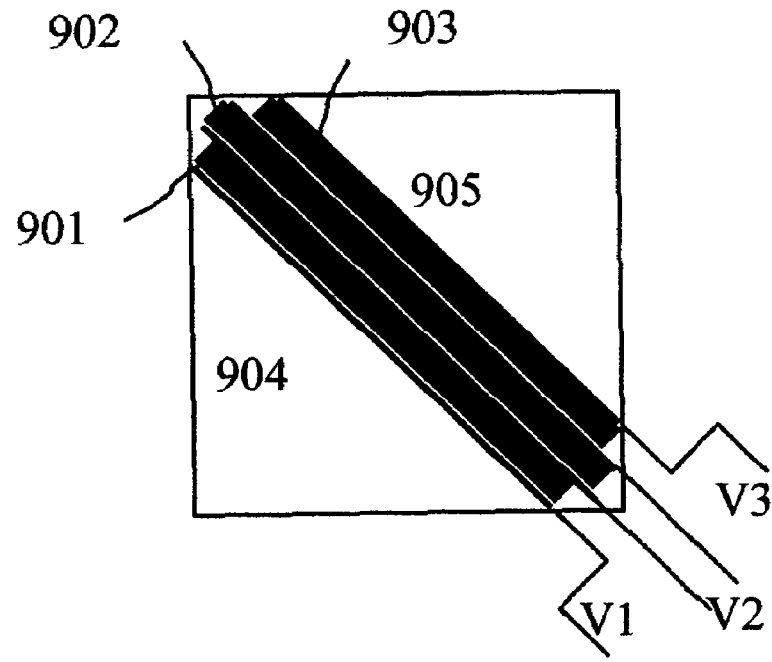
FIG. 9A shows a switchable dichroic mirror.
Figure 9B:
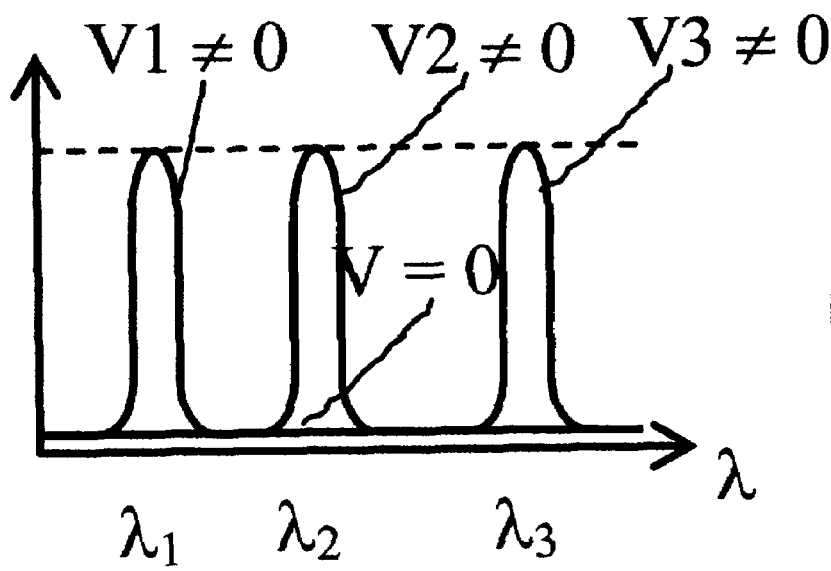
FIG. 9B shows a graph of reflectivity vs wavelength of a switchable dichroic mirror.

FIG. 9(*a*) shows the switchable dichroic mirror (900) which is used as the switchable dichroic mirror (406) in FIG. 4, (506) in FIG. 5, and (606) in FIG. 6. This switchable dichroic mirror (900) contains three stacked switchable holographic liquid crystal (H-LC) films (901, 902, 903). The switchable holographic liquid crystal film (901) reflects a narrow band at the laser wavelength $\lambda_1$ under non-zero electric field and is in transparent sate under zero electric field. The switchable holographic liquid crystal film (902) reflects at the laser wavelength $\lambda_2$ under non-zero electric field and is in transparent state under zero electric field. The switchable holographic liquid crystal film (903) reflects at the laser wavelength $\lambda_3$ under non-zero electric field and is in transparent state under zero electric field. The three switchable holographic films (901, 902, 903) are sandwiched between two right-angle prisms (904, 905).

FIG. 9(*b*) schematically shows the electro-optical response of this switchable dichroic mirror. The mirror is in transparent state when all the three switchable holographic films (901, 902, 903) are under zero electric field. The mirror exhibits three narrow band reflection peaks at the desired laser wavelengths $\lambda_1$, $\lambda_2$, and $\lambda_3$ when the three holographic films (901, 902, 903) are under non-zero electric field. The mirror can also exhibit one or two narrow band reflection peaks at proper wavelengths of $\lambda_1$, $\lambda_2$, and $\lambda_3$ when one or two of the three holographic films (901, 902, 903) are under non-zero electric field.

Figure 10A:
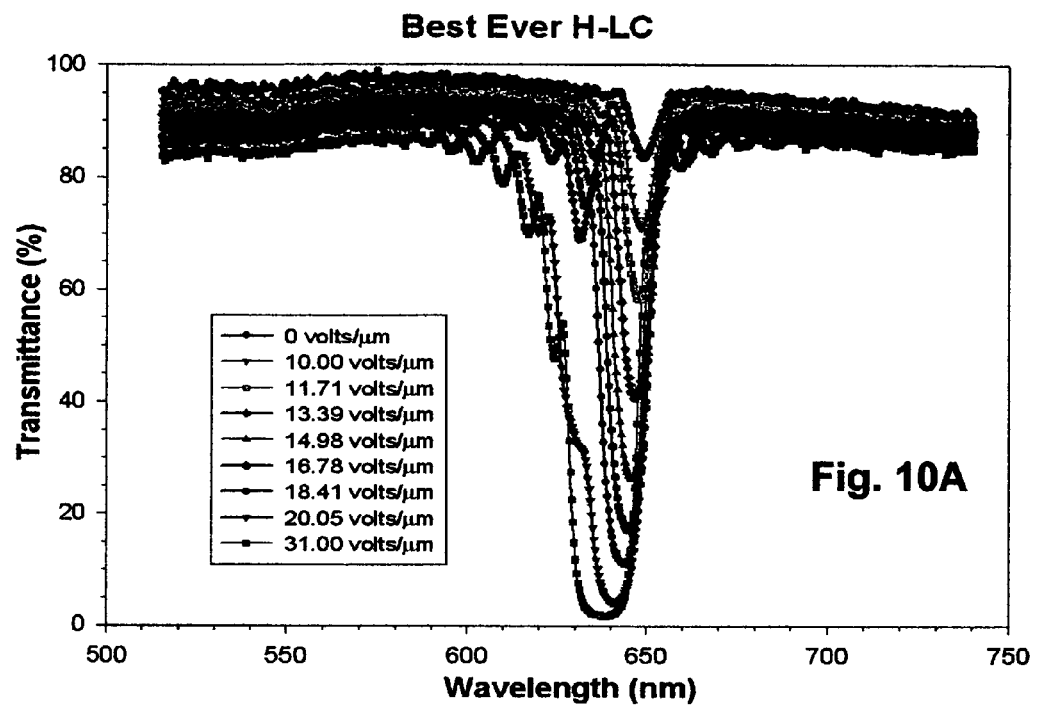
FIG. 10A shows a switchable dichroic mirror reflecting at 638.2 nm.
Figure 10B:
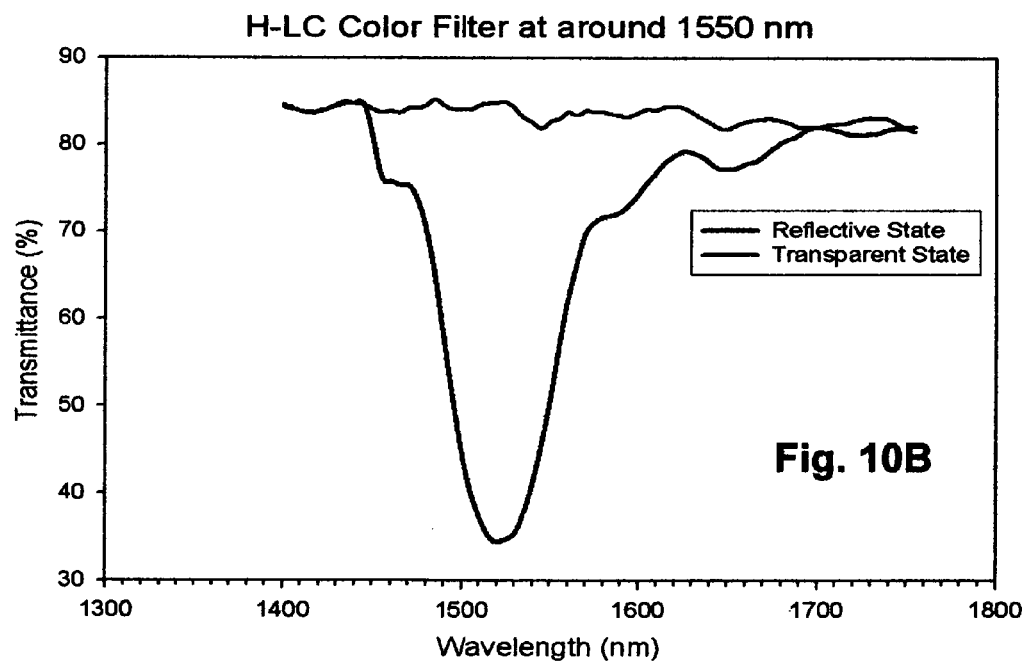
FIG. 10B shows a switchable dichroic mirror reflecting at and 1,532 nm.

FIGS. 10(*a*) and (*b*) show exemplary switchable dichroic mirrors having switchable Bragg reflection band at 638.7 nm and 1,523 nm, respectively. The visible switchable mirror exhibits an electrically controllable reflectivity between 4% and 98.5%. The 4% residual reflection under zero voltage is the Fresnel reflection from the mirror surfaces, which can be eliminated either via index matching or anti-reflection (AR) coating. The electro-optical response of the IR switchable mirror at 1,523 nm has been measured. The on-time is 752 µs and the off-time is 880 µs. Switchable mirrors with any Bragg wavelength can be fabricated by choosing the proper holographic exposure parameters.

An ideal holographic liquid crystal filter for a switchable dichroic mirror should exhibit a narrow band reflection peak at the desired wavelength. The peak reflectivity is electrically switchable or controllable.

The programmable wave plates are made from electro-optically active material whose refractive index changes with applied electric field. Liquid crystal material is a preferable material whose optical phase can be electrically controlled at the desired wavelength $\lambda_i$, here i=1, 2, . . . .In addition to conventional liquid crystals such as nematic liquid crystal and ferro-electric liquid crystal, holographic liquid crystal (HLC) and dual-frequency liquid crystal (DFLC) are also good candidates because of their fast electro-optical response speed. Both HLC and DFLC have response time in millisecond or even sub-millisecond. Varying the voltage amplitude across the liquid crystal controls the wave plate optical retardance. Their working principle is detailed as follows.

Figure 11:
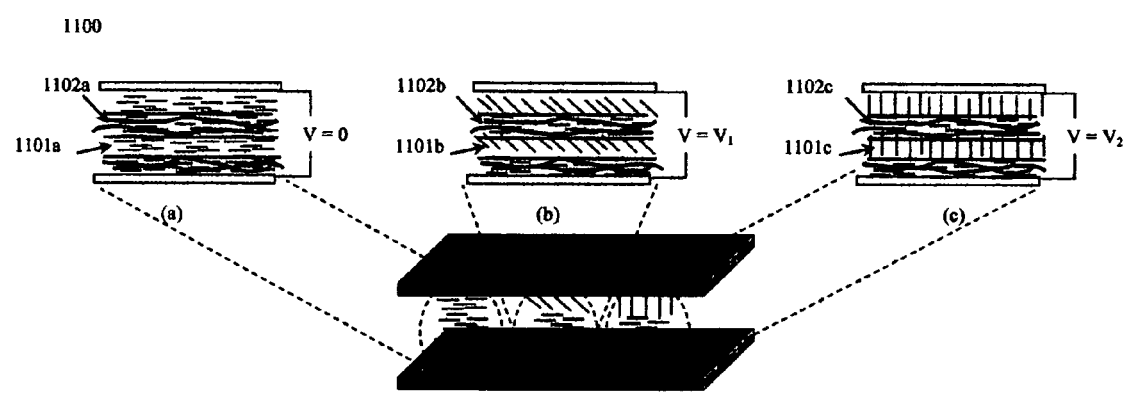
FIG. 11 shows an exemplary illustration of holographic liquid crystal optical phased array.

An H-LC device (1100) has a Bragg structure as shown in FIG. 11, which consists of electrically addressable low molecular weight (LMW) LC layers ($d_{lc}$) (1101*a, b, c*) and passive polymer layers ($d_p$) (1102*a, b, c*). Assume that $n_{lce}$ and $n_{lco}$ are the extraordinary and ordinary refractive index of the LMW LC while $n_{pe}$ and $p_{po}$ are the extraordinary and ordinary refractive index of the polymer layers, respectively. In the absence of an electric field (FIG. 11(*a*), the LMW LC layers (1101*a*) is homogeneously aligned with a refractive index of $n_{lce}$ for a P-polarized incident beam. Under an applied electric field, the refractive index is gradually changed (FIG. 11*b*) to $n_{lco}$ when the LC molecules in the LC layers (1101*b*) are tilted toward the applied electric field. When the electric field strength is sufficiently strong, the liquid crystal molecules inside the liquid crystal layers (1101*c*) are vertically aligned (FIG. 11*c*), provided that the LC has a positive dielectric anisotropy $\Delta\epsilon$. It is pointed out that the H-LC intrinsic Bragg reflection peak should be located out of the laser wavelength range being modulated. However, since H-LC exhibits non-zero retardance under zero electric field extra phase compensation is required to reach a net-zero retardance. This makes the system more complicated. Therefore, using DFLC liquid crystal material for the programmable wave plates is more preferred.

A DFLC exhibits a cross-over frequency ( ) where its dielectric anisotropy $\Delta\epsilon$ changes its sign from positive in the low frequency regime ( ) to negative in the high frequency regime ( ). In the absence of an electric field, assume that all the DFLC molecules are vertically aligned under the help from an alignment agent such as a treated polyimide. Under this situation, the normally incident light onto the VAN cell sees no phase retardation. When a high-frequency electric field is applied, the LC directors are oriented parallel to the cell surface in preferred direction that is predetermined by the polyimide to generate a non-zero phase shift. To switch back, a low-frequency electric field is applied that reorients the LC directors back to the vertical alignment texture. Since the ON and OFF states are all electric field assisted, fast rise and decay times are expected.

After each (3×1(1×3)) fan-out switch, there is an optical beam steering device (BSD). In principle, the BSD can be any commercially available BSD produce or state-of-the-art technology(s). Candidate beam steering devices include Gimball, optical phased array (OPA), liquid crystal optical phased array (LCOPA), birefringent prisms, micro-electro-mechanical systems (MEMs), to name a few. In the following, we specifically introduce a fast LCOPA made from H-LC.

FIG. 12 shows an exemplary beam steering device (1200) made from holographic liquid crystal (H-LC) with a Bragg structure consisting of electrically addressable low molecular weight (LMW) LC layers (1201) and passive polymer layers (1202). The optical phase retardation profile within the H-LC is generated by the voltage profile through the pixilated electrodes (1203) coated with alignment layers (1204). As a result, an optical phased array is formed for beam steering operation. Such a Bragg structure gives rise to a fast speed and robust environment stability with less temperature dependency.

All of the above patents, application, and references are hereby incorporated herein by reference in their entirety including incorporated material.

Obviously, many modifications and variations of the present invention are possible in light of the above teachings.

It is therefore to be understood that, within the scope of the appended claims, the invention may be practiced otherwise than as specifically described.

We claim:

1. A device for receiving a plurality of m input laser beams of power $P_i$ and different wavelengths $\lambda i$, where i runs from 1 to m, and dividing the power $P_i$ of at least two of the m input laser beams between at least two output laser beams for each of the at least two of the m input laser beams, comprising:

at least one m×n fan-out scanner switch for receiving the plurality of m input laser beams, the m×n fan-out scanner switch comprising optical arrays of electrically controllable switchable dichroic mirrors (DC)'s, electrically controllable polarizing beamsplitters (PBS)'s and electrically controllable programmable wave plates (PWP)'s, the m×n fan-out scanner switch switching output laser beams into at least two of n equals at least 7 exit ports as the phase retardation of the electrically controllable programmable wave plates and the switching of the electrically controllable switchable dichroic mirrors are changed, wherein six exit ports output laser beams into directions having elevation angle of 30 degrees and azimuthal angles separated by approximately 60 degree angles, and wherein a seventh exit port outputs a laser beam into a direction having an elevation angle of 90 degrees, wherein the azimuthal and elevation angles are determined with respect to a coordinate system.

2. The device of claim 1, wherein at least two of the m input beams having wavelengths $\lambda i$ and $\lambda j$ are combined into a single beam having two coaxial laser beams having wavelengths $\lambda i$ and $\lambda j$ exiting at least one of the n exit ports.

3. The device of claim 2, wherein the at least two of the m input beams are combined into at least two single beams, each of the at least two single beams having two coaxial laser beams of different wavelengths exiting at least two of the n exit ports.

4. The device of claim 1, further comprising a beam steering device (BSD) attached to each of the n exit ports, the BSD for fine control of output laser beams exiting exit ports of the device.

5. The device of claim 4, wherein the BSD is a liquid crystal optical phased array (LCOPA) BSD.

6. The device of claim 4, wherein the BSD is a ferroelectric liquid crystal (FLC) spatial light modulator (SLM) BSD.

7. The device of claim 4, wherein the BSD is a liquid crystal blazed grating (LCBG) BSD.

8. The device of claim 4, wherein the BSD is a MEMS BSD.

9. The device of claim 4, wherein the BSD is a Gimbal BSD.

* * * * *